United States Patent
Kumar et al.

(10) Patent No.: US 11,093,400 B2
(45) Date of Patent: Aug. 17, 2021

(54) LOCK-FREE SHARING OF LIVE-RECORDED CIRCULAR BUFFER RESOURCES

(71) Applicant: Sling Media Pvt. Ltd., Bangalore (IN)

(72) Inventors: Amit Kumar, Karnataka (IN); Gopikumar Ranganathan, Tamil Nadu (IN)

(73) Assignee: Sling Media Pvt. Ltd., Bangalore (IN)

(*) Notice: Subject to any disclaimer, the term of this patent is extended or adjusted under 35 U.S.C. 154(b) by 64 days.

(21) Appl. No.: 16/707,056

(22) Filed: Dec. 9, 2019

(65) Prior Publication Data
US 2021/0109857 A1 Apr. 15, 2021

(30) Foreign Application Priority Data
Oct. 15, 2019 (IN) .............................. 201941041686

(51) Int. Cl.
| | |
|---|---|
| *G06F 12/08* | (2016.01) |
| *G06F 3/06* | (2006.01) |
| *G06F 5/12* | (2006.01) |
| *G06F 12/0842* | (2016.01) |
| *G06F 12/0815* | (2016.01) |
| *H04N 21/44* | (2011.01) |
| *H04N 21/439* | (2011.01) |

(52) U.S. Cl.
CPC ........ *G06F 12/0842* (2013.01); *G06F 3/0656* (2013.01); *G06F 5/12* (2013.01); *G06F 12/0815* (2013.01); *G06F 2212/1024* (2013.01); *H04N 21/4392* (2013.01); *H04N 21/44004* (2013.01)

(58) Field of Classification Search
None
See application file for complete search history.

(56) References Cited

U.S. PATENT DOCUMENTS

| | | | | |
|---|---|---|---|---|
| 6,819,732 | B1* | 11/2004 | Saveli | G06F 5/12 375/371 |
| 2002/0174273 | A1* | 11/2002 | Castellano | G06F 5/06 710/29 |
| 2002/0196462 | A1* | 12/2002 | Kosaka | G11B 20/10527 358/1.15 |
| 2005/0058148 | A1* | 3/2005 | Castellano | G06F 5/12 370/428 |
| 2009/0113087 | A1* | 4/2009 | Kohinata | H04N 21/4147 710/60 |

(Continued)

*Primary Examiner* — Kaushikkumar M Patel
(74) *Attorney, Agent, or Firm* — Kilpatrick Townsend & Stockton LLP (57) ABSTRACT

Novel techniques are described for lock-free sharing of a circular buffer. Embodiments can provide shared, lock-free, constant-bitrate access by multiple consumer systems to a live stream of audiovisual information being recorded to a circular buffer by a producer. For example, when a producer system writes a data stream to the circular buffer, the producer system records shared metadata. When a consumer system desires to begin reading from the shared buffer at a particular time, the shared metadata is used to compute a predicted write pointer location and corresponding dirty region around the write pointer at the desired read time. A read pointer of the consumer system can be set to avoid the dirty region, thereby permitting read access to a stable region of the circular buffer without relying on a buffer lock.

20 Claims, 6 Drawing Sheets

(56) References Cited

U.S. PATENT DOCUMENTS

| | | | | |
|---|---|---|---|---|
| 2009/0153188 A1* | 6/2009 | Vorbach | ............... | G06F 9/30 |
| | | | | 326/38 |
| 2011/0249192 A1* | 10/2011 | Shamarao | ............. | G09G 5/005 |
| | | | | 348/725 |
| 2012/0028567 A1* | 2/2012 | Marko | ............... | H04W 4/20 |
| | | | | 455/3.02 |
| 2012/0317380 A1* | 12/2012 | Agrawal | ............... | G06F 5/10 |
| | | | | 711/159 |
| 2018/0330467 A1* | 11/2018 | Park | ............ | G06F 3/068 |

* cited by examiner

LOCK-FREE SHARING OF LIVE-RECORDED CIRCULAR BUFFER RESOURCES

CROSS-REFERENCE TO RELATED APPLICATIONS

The present application claims priority to India Provisional Application No. 201941041686, filed Oct. 15, 2019, entitled "LOCK-FREE SHARING OF LIVE-RECORDED CIRCULAR BUFFER RESOURCES." The entire contents of India Provisional Application No. 201941041686 is incorporated herein by reference for all purposes.

FIELD

This invention relates generally to memory systems, and, more particularly, to lock-free read sharing of live-recorded circular buffer resources.

BACKGROUND

In various types of systems, it is desired to obtain and store audio and/or video data, and to allow other systems to read the stored data as new data is being obtained. For example, in context of a security camera, it can be desirable for the security camera to continuously record audiovisual information, even while allowing other systems to read the recorded data. Some such systems use circular buffers. Circular buffers effectively have no beginning or end, so that earlier-recorded data can continuously and sequentially be overwritten by newly recorded data (e.g., the newest data continuously overwrites the oldest data in the buffer). As such, circular buffers can enable continuous recording with limited storage capacity.

However, problems can arise when providing read access during such continuous recording, particular when providing read access concurrently to multiple systems. Conventionally, when a particular system desires to read from the circular buffer, the particular system requests a buffer lock. For example, the buffer lock halts any new writing to the buffer restricts all reading only to the particular system to help ensure that the particular system can read from a stable environment. While this can be an effective approach in some cases for a single reading system (and even, in some cases, for a small number of reading systems), the approach can have limitations, including not scaling well to larger numbers of reading systems. For example, during the time each reading system locks the buffer, new data is not being recorded. As the number of reading systems increases, the amount of time the buffer is locked similarly increases. At some point, the multiple buffer locks cause no new writing to occur for an undesirably long period of time. Similarly, at times, a reading system may fail to release its buffer lock (e.g., though it has completed reading, it fails to unlock the buffer). In such cases, the entire system can effectively fail, as no new data is written to the system.

BRIEF SUMMARY

Among other things, embodiments provide novel systems and methods for lock-free sharing of a circular buffer. For example, embodiments can provide shared, lock-free, constant-bitrate access by multiple consumer systems to a live stream of audiovisual information being recorded to a circular buffer by a producer. Each consumer or producer system can continue to access the shared circular buffer resources without waiting for others of the systems to free the shared circular buffer resources. According to embodiments herein, when a producer system writes a data stream to the circular buffer, the producer system records shared metadata. When a consumer system desires to begin reading from the shared buffer at a particular time, the shared metadata is used to compute a predicted write pointer location and corresponding dirty region around the write pointer at the desired read time. A read pointer of the consumer system can be set to avoid the dirty region, thereby permitting read access to a stable region of the circular buffer without relying on a buffer lock.

According to one set of embodiments, a method is provided for lock-free sharing of a circular buffer. The method includes: receiving, at a consumer system at a request time, a request to read data from a circular buffer having a data stream being written thereto by a producer system at a bitrate; consulting shared metadata indicating a start time of the data stream; computing a predicted write pointer location corresponding to the request time as a function of the start time and the bitrate of the data stream; computing a dirty region around the write pointer location, the dirty region beginning at a dirty region start bit of the circular buffer prior to the write pointer and ending at a dirty region end bit of the circular buffer subsequent to the write pointer; setting a read pointer location for the consumer system as a location in the circular buffer outside the dirty region; and initiating reading of data of the data stream at the read pointer location by the consumer system, the initiating being responsive to the request.

According to another set of embodiments, a lock-free circular buffer sharing system is provided. The system includes a write pointer processor, a dirty region processor, and a read module. The write pointer processor is to consult shared metadata indicating a start time of a data stream being written to a circular buffer by a producer system at a bitrate, and to compute a write pointer location as a function of the start time and the bitrate of the data stream. The dirty region processor is coupled with the write pointer processor to compute a dirty region around the write pointer location, the dirty region beginning at a dirty region start bit of the circular buffer prior to the write pointer and ending at a dirty region end bit of the circular buffer subsequent to the write pointer. The read module is coupled with the dirty region processor to set a read pointer location for a consumer system as a location in the circular buffer outside the dirty region, and to initiate reading of data of the data stream at the read pointer location by the consumer system. In various embodiments, the system can include one or more producer systems, memory systems, and/or consumer systems.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
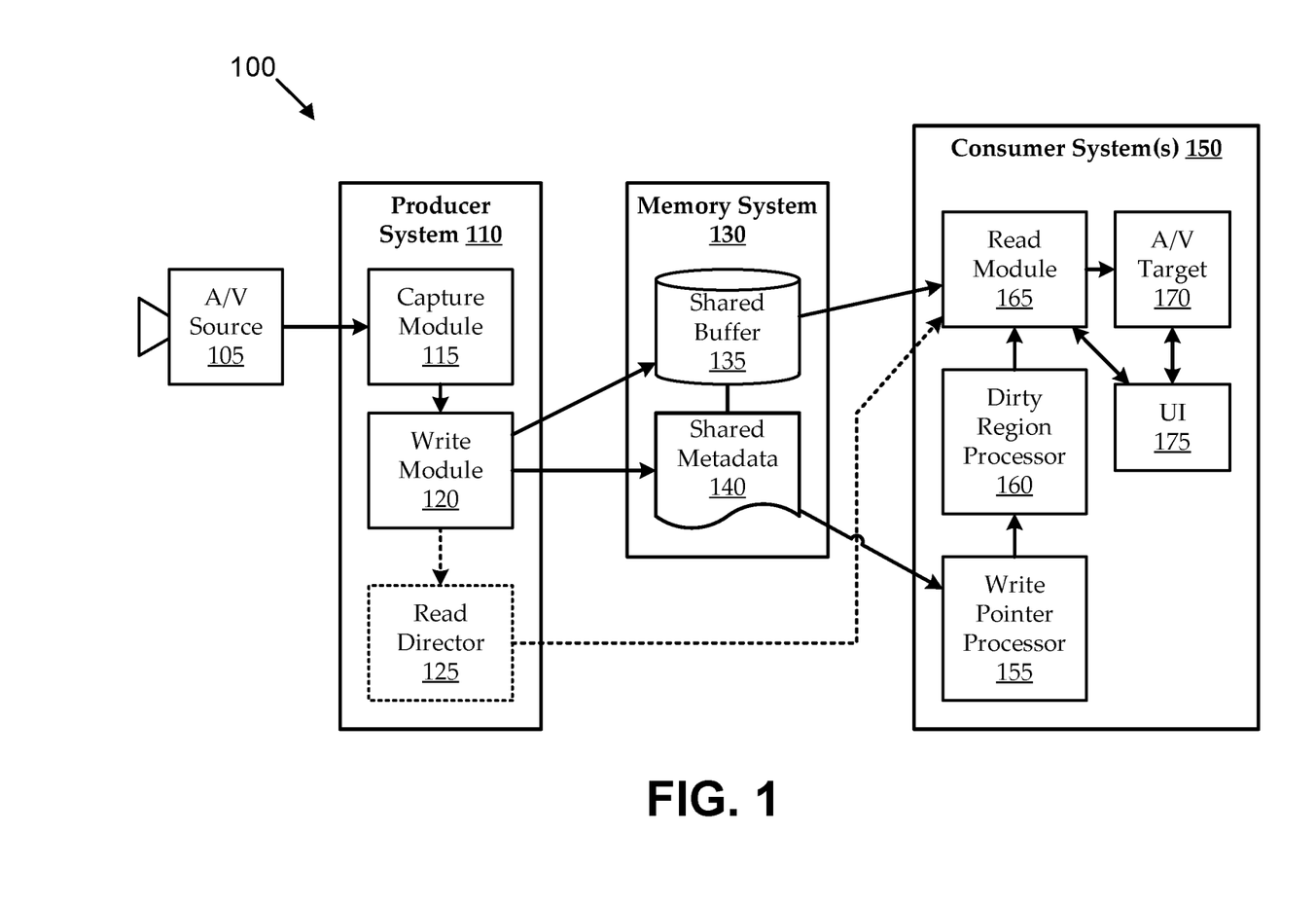
FIG. 1 shows a shared audiovisual (A/V) production and consumption environment, according to various embodiments.

Turning to FIG. 1, a shared audiovisual (A/V) production and consumption environment 100 is shown, according to various embodiments. The environment 100 includes an A/V source 105, a producer system 110, a memory system 130, and one or more consumer systems 150. The various components are illustrated as coupled with each other. Such coupling can be implemented in any suitable manner. In some implementations, all of the A/V source 105, the producer system 110, the memory system 130, and one or more consumer systems 150 are integrated into a single lock-free circular buffer sharing system. In other embodiments, the lock-free circular buffer sharing system includes only a portion of the components illustrated in FIG. 1. In some embodiments, each of the A/V source 105, the producer system 110, the memory system 130, and one or more consumer systems 150 are implemented as separate systems, coupled together by any suitable wired and/or wireless connections. In one such embodiment, the A/V source 105 is connected with the producer system 110 via a wired connection (e.g., hard-wired, coupled via a standard or dedicated physical port, etc.); and the producer system 110 and one or more consumer systems 150 are in communication with the memory system 130 via a high-bandwidth wireless network. In another such embodiment, the A/V source 105, the producer system 110, and the memory system 130 are all integrated into a single system (e.g., a security camera with an integrated buffer); and the one or more consumer systems 150 are in communication with the integrated system via wired and/or wireless connections. In embodiments in which one or more components is coupled via a network, the network (not shown) can include any suitable wired and/or wireless communication links, such as long-range wired and/or wireless links (e.g., cellular network links, cable network links, fiber-optic network links, satellite network links, etc.), medium-range wireless links (e.g., wireless-fidelity (WiFi) network links, wireless local area network (WLAN) links, etc.), short-range wireless links (e.g., Bluetooth network links, ZigBee network links, etc.), short-range wired links (e.g., coaxial links, high-definition multimedia interface (HDMI) links, etc.), etc.

For the sake of illustration, the environment 100 can be a security camera environment. In such an environment 100, the A/V source 105 includes a security camera that can receive A/V information, including video information (e.g., and audio information, in some cases). The footage is captured by the producer system 110 and converted into an A/V data stream, which is written to a shared circular buffer 135 of the memory system 130. While the data stream is being written, the one or more consumer systems 150 can read data from the circular buffer 135. Only one A/V data stream write path is shown for the sake of simplicity. However, in some such environments, A/V data from multiple A/V sources 105 (e.g., multiple security cameras directed at multiple locations) can be written to multiple respective circular buffers 135 of one or more memory systems 130 by one or more producer systems 110; and some or all of multiple consumer systems 150 can read from the multiple circular buffers 135 in a shared manner.

In the past, applications involving recording of continuously acquired data streams (e.g., as from security cameras, certain sensors, etc.) involved recording directly to a storage medium (e.g., a magnetic tape) with limited capacity and changing to a different storage medium (e.g., by inserting a new magnetic tape) to continue recording. More recently, such applications began using buffers, including circular buffers, to provide a more continuous recording experience. A circular buffer is a type of memory that effectively has no beginning or end, so that earlier-recorded data can continuously and sequentially be overwritten by newly recorded data (e.g., the newest data continuously overwrites the oldest data in the buffer). As such, circular buffers can enable continuous recording, even with limited storage capacity. For example, in context of a security camera, the camera can continuously record without concern that it will reach the end of the buffer memory.

However, problems can arise when providing read access during such continuous recording, particular when providing read access concurrently to multiple systems. For example, ensuring that systems are reading stable data can involve ensuring that such data is not being accessed by other systems at the same time. To that end, conventionally, when a particular system desires to read from the circular buffer, the particular system requests a buffer lock. For example, the buffer lock halts any new writing to the buffer and restricts all reading only to the particular system to help ensure that the particular system can read from a stable environment. While this can be an effective approach in some cases for a single reading system (and even, in some cases, for a small number of reading systems), the approach can have limitations, including not scaling well to larger numbers of reading systems. For example, during the time each reading system locks the buffer, new data is not being recorded. As the number of reading systems increases, the amount of time the buffer is locked similarly increases. At some point, the multiple buffer locks cause no new writing to occur for an undesirably long period of time. Similarly, at times, a reading system may fail to release its buffer lock (e.g., though it has completed reading, it fails to unlock the buffer). In such cases, the entire system can effectively fail, as no new data is written to the system.

Embodiments described herein seek to provide access to shared circular buffer resources without relying on buffer locks. For example, even while the producer system 110 continues to write to the circular buffer 135 of the memory system 130, embodiments can provide shared read access to one or more consumer systems 150. According to such embodiments, one or more consumer systems 150 can access live data being written to the circular buffer 135 by the producer system 110 without managing buffer locks, without waiting for other systems to release buffer locks, and without concern that another system will fail to release a buffer lock.

Embodiments can operate in any suitable context. For example, while described above in context of a security camera, the A/V source 105 can include any suitable type of sensor. In some implementations, the A/V source 105 includes a video camera, or other video sensors. In some implementations, the A/V source 105 includes a microphone, or other audio transducer, or audio sensors. In some implementations, the A/V source 105 includes environmental sensors, such as temperature sensors, pressure sensors, light sensors, accelerometers, gyroscopic sensors, etc. Further, while described herein as "audiovisual" data, or "A/V" data, the data (and data streams) can include any suitable data corresponding to the type of A/V source 105. For example, an A/V source 105 that includes a camera can obtain data that includes video data, while an A/V source 105 that includes a gyroscopic sensor can obtain data that includes gyroscopic data. Similarly, components of the producer system 110, the memory system 130, the consumer system(s) 150, etc. can be configured in accordance with the type of A/V source 105 and corresponding type of data being obtained. For example, in implementations having an A/V source 105 that includes a high-definition video camera, it may be desirable for the producer system 110 to include high-bitrate components and for the memory system 130 to allocate larger capacity to the circular buffer 135. In contrast, in implementations having an A/V source 105 that includes a narrow-band Internet of Things (nb-IoT) temperature sensor, it may be possible to implement the producer system 110 with low-bitrate components and to implement the memory system 130 with a smaller-capacity circular buffer 135.

Embodiments of the producer system 110 include a capture module 115 and a write module 120. The capture module 115 is coupled with the A/V source 105 to capture data obtained by the A/V source 105 and to generate a data stream from the data. Generation of the data stream can involve any suitable processing, such as amplifying, filtering, transcoding, encoding, packetizing, modulating, etc. The write module 120 is coupled with the capture module 115 and the circular buffer 135 to receive the data stream and to write the data stream to the circular buffer 135. The write module 120 can write the data stream to the circular buffer 135 in any suitable manner, for example, in any suitable format and at any suitable bitrate or bitrates.

When the write module 120 begins to write the data stream to the circular buffer 135, the write module 120 can also record characteristics of the writing to a shared metadata 140 file. As described herein, the shared metadata 140 is used to enable shared, lock-free read access to the circular buffer 135 by the one or more consumer systems 150. In some embodiments, the shared metadata 140 indicates a start time at which the write module 120 began writing the data stream that is currently being written to the circular buffer 135. The start time can be recorded with reference to any suitable clock and/or buffer reference. For example, the start time can be recorded in milliseconds, and it can be assumed that the write module 120 always begins to write at an address '0'. In other implementations, the write module 120 may begin writing a data stream at any buffer location (e.g., where the previously written data stream ended), in which implementations the start time can indicate both a time and a buffer location where the current writing began. In some embodiments, the shared metadata 140 also indicates the bitrate at which the write module 120 is currently writing. In other embodiments, the bitrate of the write module 120 can be obtained without referencing the shared metadata 140. For example, in implementations for which the write module 120 is hard-coded always to write at a single bitrate, other components may know the bitrate of the write module 120 without having to consult the shared metadata 140 (and the shared metadata 140 may not include such data, accordingly). The shared metadata 140 can include any other suitable information in various embodiments. For example, it can be desirable in certain applications for the shared metadata 140 to indicate an identification of the A/V source 105 (e.g., where the producer system 110 is in communication with multiple A/V sources 105), an end time of a previously written data stream, an encoding format, etc. Some implementations of the shared metadata 140 also include information about the circular buffer 135, such as buffer size. In some embodiments, as illustrated, the shared metadata 140 is stored in the memory system 130 along with the circular buffer 135. In other embodiments, the shared metadata 140 is stored by the write module 120, or in any other suitable location that is accessible to other components to facilitate features described herein.

Embodiments of the circular buffer 135 can buffer the data stream using any suitable type of memory, any suitable memory block size, etc. The circular buffer 135 can be implemented as a circular queue, a cyclic buffer, a ring buffer, or any other end-to-end-connected data structure of fixed size. As described herein, the circular buffer 135 permits continuous writing of the data stream by the write module 120. For example, the oldest data in the circular buffer 135 is continuously overwritten by the newest data being written to the circular buffer 135.

Embodiments of the consumer systems 150 include a write pointer processor 155, a dirty region processor 160, a read module 165, and an A/V target 170. The components of a particular consumer system 150 can be integrated in a single package or distributed among multiple packages. For example, the A/V target 170 can be a separate component that is coupled with other components of the consumer system 150 via a wired or wireless connection. The write pointer processor 155 can compute a write pointer location as a function of the start time and the bitrate of the data stream that is currently being written to the circular buffer 135 by the producer system 110. For example, the write pointer processor 155 is coupled with the shared metadata 140 (e.g., with the memory system 130) to obtain the start time (and the bitrate, in some cases). Embodiments of the write pointer processor 155 can compute a present write pointer location by using the start time, the bitrate, the circular buffer 135 size, and a current time.

Embodiments of the dirty region processor 160 are coupled with the write pointer processor 155 to compute a dirty region around the write pointer location. The dirty region represent a region determined to be too close to the write pointer location to permit a stable read environment. For example, it can be assumed that a consumer system 150 can safely read from anywhere in the circular buffer 135 outside of the dirty region. The dirty region is computed by the dirty region processor 160 to begin at a dirty region start bit of the circular buffer 135 prior to the write pointer and to end at a dirty region end bit of the circular buffer 135 subsequent to the write pointer.

Having computed the dirty region, one or more consumer systems 150 can be permitted to read from any location outside the dirty region. The read modules 165 of each consumer system 150 can be coupled with the dirty region processor 160 to set a read pointer location for the consumer system 150 as a location in the circular buffer 135 outside the dirty region. The read module 165 can then initiate reading of data of the data stream beginning at the read pointer location. As the data is read by the read module 165, the data can be passed to one or more A/V targets 170. The A/V targets 170 can include any suitable components by which to store and/or consume the data read from the circular buffer 135. In some embodiments, the A/V target 170 includes local storage, such as a hard-disk drive, or other local archival storage. In other embodiments, the A/V target 170 includes, or is in communication with, cloud storage, or other remote storage. In other embodiments, the A/V target 170 includes a playback device, such as a video monitor, speaker, etc. In other embodiments, the A/V target 170 includes data processing and/or monitoring components, such as components to perform real-time image recognition, sensor data threshold detection, data aggregation, etc.

In some embodiments, the consumer system 150 can include a user interface (UI) subsystem 175. The UI subsystem 175 can be used, for example, to receive a request to read data from the circular buffer 135. The request can be received by a human user and/or from a machine user. For example, the UI subsystem 175 can include a graphical user interface presented via a display of the A/V target 170, virtual or physical interface controls integrated directly with the read module 165, etc. In some embodiments, the computation of the write pointer location and dirty region are performed by the write pointer processor 155 and the dirty region processor 160 responsive to the request received via the UI subsystem 175. For example, the write pointer location and dirty region are computed with respect to a request time indicated by the received request (e.g., either the actual time of the request, or the request indicates a subsequent read time).

In some embodiments, the producer system 110 includes a read director 125. The read director 125 can signal the consumer systems 150 and/or otherwise direct operations thereof. In some embodiments, the read director 125 signals the consumer systems 150 when there is an update to the shared metadata 140. For example, each time the producer system 110 begins writing a new data stream, changes the bitrate at which it is writing, etc., the read director 125 broadcasts a signal to all the consumer systems 150. In some implementations, such a signal directs the consumer systems 150 to consult the shared metadata 140 for updated information. In other implementations, such a signal informs the consumer systems 150 that any shared metadata 140 they previously obtained is now stale; as such, the next time the consumer systems 150 desire to read from the circular buffer 135, the consumer systems 150 know to re-acquire shared metadata 140 with updated information. The read director 125 can use any suitable type of signaling. In one implementation, an inter-process communication (IPC) and/or remote procedure calling (RPC) protocol is used for signaling, such as the desktop bus (D-BUS) protocol.

Figure 2:
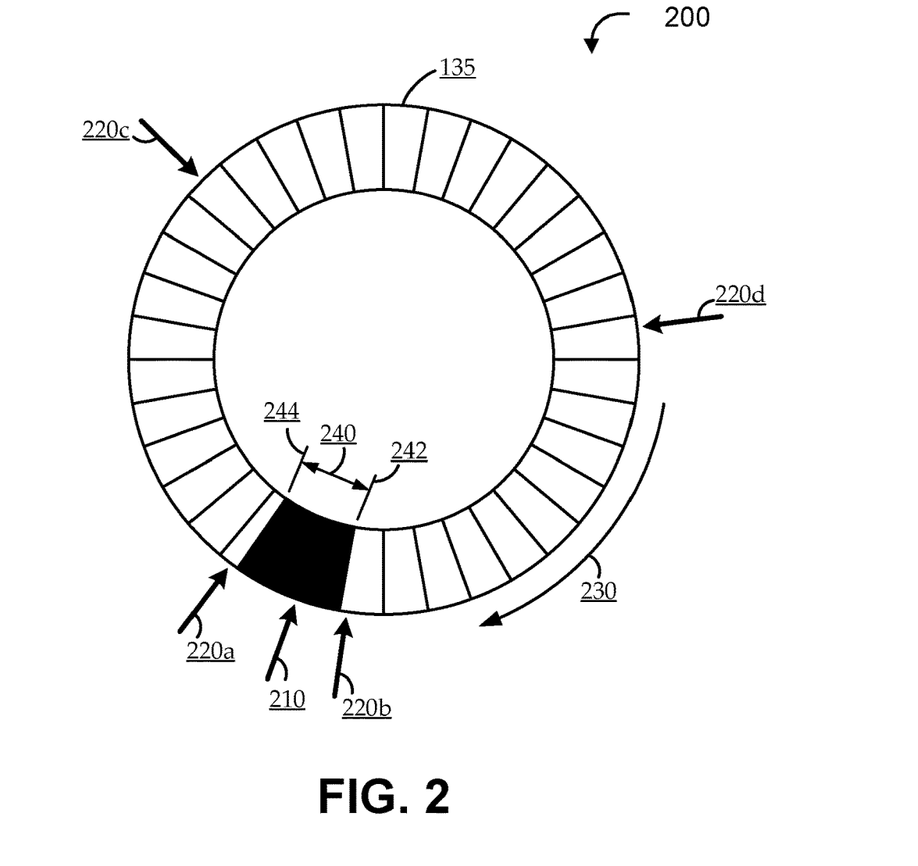
FIG. 2 shows a representation of a shared access environment with an illustrative circular buffer.

For the sake of illustration, FIG. 2 shows a representation of a shared access environment 200 with an illustrative circular buffer 135. The circular buffer 135 includes a large number of data blocks arranged sequentially according to arrow 230, and the data blocks are logically connected end to end (i.e., a last memory address in the circular buffer 135 is followed sequentially by a first address in the circular buffer 135). The illustrated environment 200 shows a current write pointer location 310 at which a producer system 110 is presently writing a data stream. A dirty region 240 is defined around the write pointer location 210 as a region between a dirty region start bit 242 of the circular buffer 135 prior to the write pointer 210 and a dirty region end bit 244 of the circular buffer 135 subsequent to the write pointer 210. The illustrated environment 200 also shows different respective current read pointer locations 220 of four consumer systems 150.

As one illustrative example, the write pointer processor 155 computes a present write pointer location of write pointer 210 by using the start time, the bitrate, the circular buffer 135 size, and a current time. Suppose the circular buffer 135 size is 10 Megabytes (10*1024*1024=10,485,760 bytes). The shared metadata 140 indicates a start time of 1000 milliseconds and a bitrate of 8 megabits per second (Mbps) (1*1024*1024=1,048,576 bytes per second). One of the consumer systems 150 desires to access the data stream at 25,000 milliseconds. The write pointer processor 155 can compute that the elapsed writing time for the current data stream is the time at which the consumer system 150 desires access less the start time, or 25000−1000=24,000 milliseconds. The total amount of data written during the elapsed writing time can be computed as the bitrate (in bytes per millisecond) times the elapsed writing time, or 1048576/1000* 24000=25,165,824 bytes. The current write pointer offset address can be calculated as the remainder of the total amount of data written divided by the circular buffer 135 size, or 25165824% 10485760=4,194,304 bytes, where '%' indicates a modulo operation. For example, if the write module 120 began writing the current data stream at address '0' of the circular buffer 135, the current write pointer location would be at the address corresponding to byte 4,194,304; if the write module 120 began writing the current data stream at an address corresponding to byte 100,000 of the circular buffer 135, the current write pointer location would be at the address corresponding to byte 4,294,304; and if the write module 120 began writing the current data stream at an address corresponding to byte 10,000,000 of the circular buffer 135, the current write pointer location would be at the address corresponding to byte 3,708,544 (i.e., after wrapping around the circular buffer 135).

Having computed the location of the write pointer 210 (with the "current" location representing the location at the desired read time) by the write pointer processor 155, the dirty region processor 160 can compute the dirty region 240. Extending the above example, suppose it is desired to compute the dirty region 240 as a one-second region centered around the write pointer location 210. The dirty region processor 160 can compute the dirty region start bit 242 as the current write pointer offset location minus a half-second temporal distance, or 4194304−(1048576/2)=3,670,016; bytes; and the dirty region processor 160 can compute the dirty region end bit 244 as the current write pointer offset location plus the half-second temporal distance, or 4194304+(1048576/2)=4,718,592 bytes. In some embodiments, the dirty region 240 is computed to be symmetrical, such that the dirty region start bit 242 and the dirty region end bit 244 are approximately the same distance (in opposite directions) from the write pointer 210. In other embodiments, the dirty region 240 is computed to be asymmetrical, such that the dirty region start bit 242 is a first distance prior to the write pointer 210, and the dirty region end bit 244 is a second, different distance subsequent to the write pointer 210. In some embodiments, the dirty region 240 is computed according to a predetermined value, such as a predetermined number of milliseconds or number of bytes. For example, the predetermined value can be based on a predetermined worst case read start lag time for a consumer system 150 (e.g., a worst-case amount of time between when the consumer system 150 assigns the read pointer 220 to a particular location and the consumer system 150 begins actually reading from that location). In other embodiments, the consumer system 150 has a read start lag time known to at least the consumer system 150. In some such embodiments, the dirty region 240 can be specifically computed for that consumer system 150 in accordance with the particular read start lag time of that consumer system 150.

While consumer systems 150 can safely read from any region of the circular buffer 135 outside the dirty region 240, it can be desirable to set the respective read pointer 220 locations in accordance with additional information in some cases. For example, different types of A/V targets 170 can be more compatible with particular read pointer 220 locations. For the sake of illustration, FIGS. 3 and 4 show two categories of A/V targets 170 compatible with different read pointer 220 locations.

Figure 3:
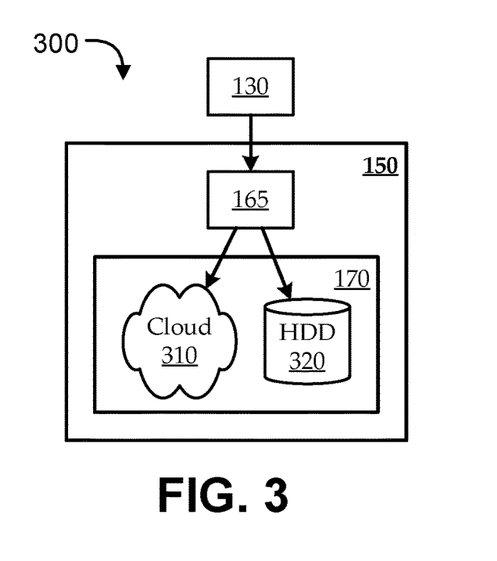
FIG. 3 shows a portion of a shared access environment that includes a consumer system with archival recording types of A/V targets.

FIG. 3 shows a portion of a shared access environment 300 that includes a consumer system 150 with archival recording types of A/V targets 170. The environment 300 can be a portion of environment 100 of FIG. 1 above, or of environment 500 of FIG. 5 below. As illustrated, the consumer system 150 is in communication with a memory system 130, so that the read module 165 of the consumer system 150 can read from the circular buffer 135 (not shown). The A/V target 170 of the consumer system 150 includes both local and remote archival recording. For example, the local archival recording can include writing the data from the circular buffer 135 to a non-transient storage medium (illustrated as hard-disk drive 320), and the remote archival recording can include writing the data form the circular buffer 135 to network storage (illustrated as cloud storage 310). In some such embodiments, it can be desirable to begin reading from as far in the past as practical. Because, in the circular buffer 135, the oldest data is continuously being overwritten by the newest data, the oldest reliable data in the circular buffer 135 can be considered the data just subsequent to the dirty region 240. Read pointer 220a of FIG. 2 illustrates such a case, in which the location of the read pointer 220a is just after the end of the dirty region 240 (i.e., at, or immediately subsequent to, the dirty region end bit 244).

Figure 4:
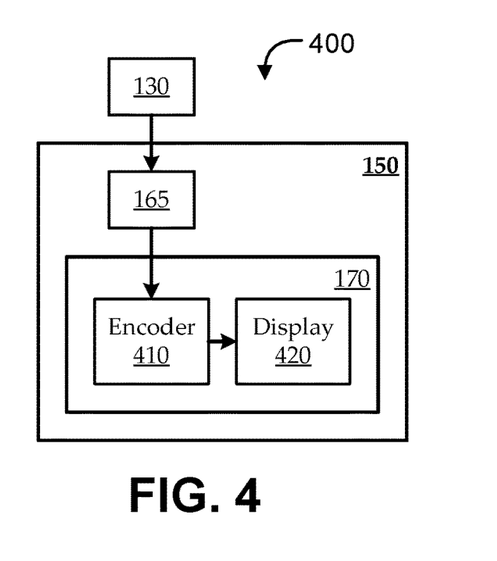
FIG. 4 shows a portion of a shared access environment that includes a consumer system with real-time recording types of A/V targets.

FIG. 4 shows a portion of a shared access environment 400 that includes a consumer system 150 with real-time recording types of A/V targets 170. The environment 400 can be a portion of environment 100 of FIG. 1 above, or of environment 500 of FIG. 5 below. As illustrated, the consumer system 150 is in communication with a memory system 130, so that the read module 165 of the consumer system 150 can read from the circular buffer 135 (not shown). The A/V target 170 of the consumer system 150 includes a real-time encoder 410 coupled with a display 420. For example, substantially as data is being read from the circular buffer 135, the data is being encoded (e.g., and/or otherwise processed) for output by the encoder 410, and output to the display 420 for real-time viewing. In another such embodiment, the encoder 410 can be configured to perform other functions, such as real-time processing and analysis (e.g., for condition detection), and the display 420 can output results of the real-time processing and analysis, as appropriate. In some such embodiments, it is desirable to begin reading from as close to the present as practical. Because the write pointer 210 is where the newest data is being written to the circular buffer 135, the newest reliable data in the circular buffer 135 can be considered the data just prior to the dirty region 240. Read pointer 220b of FIG. 2 illustrates such a case, in which the location of the read pointer 220b is just prior to the start of the dirty region 240 (i.e., at, or immediately prior to, the dirty region start bit 242).

Figure 5:
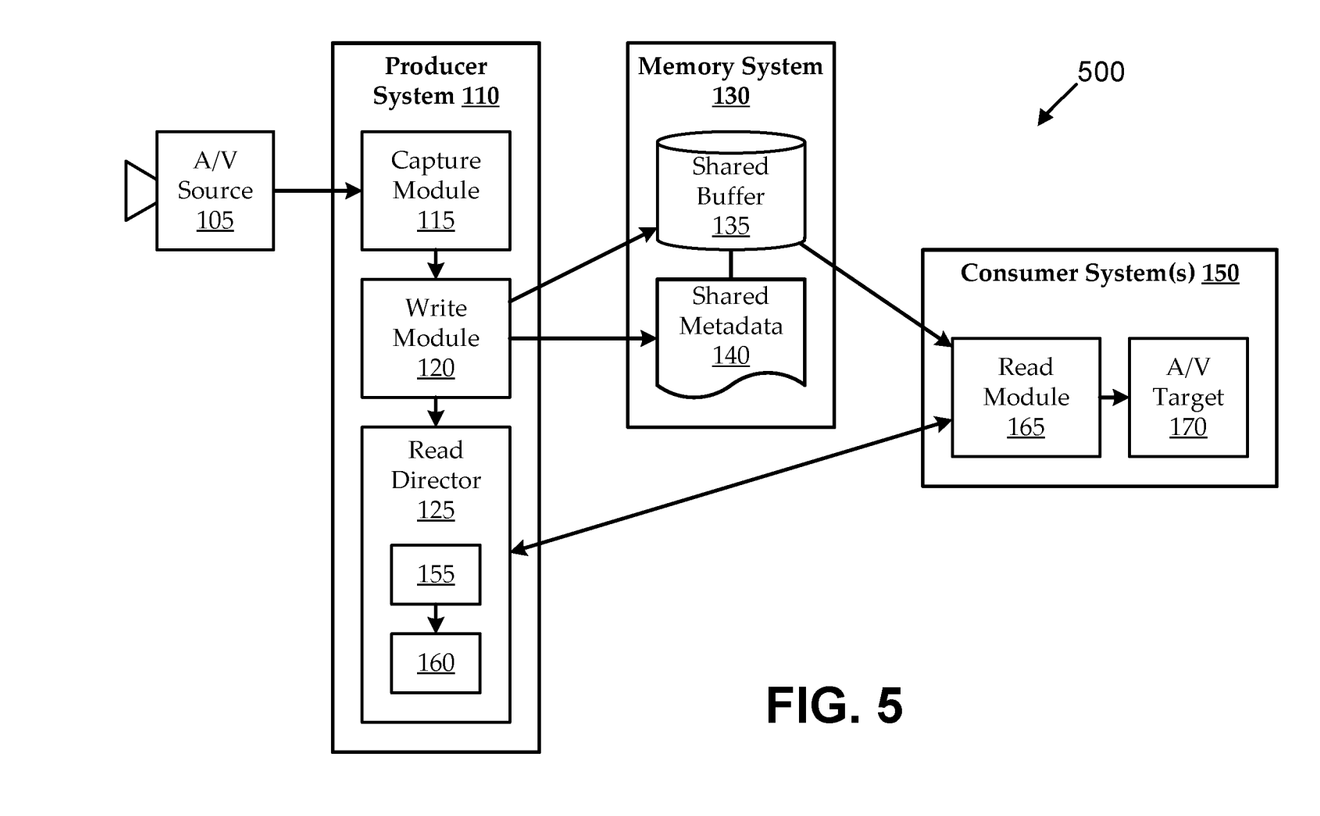
FIG. 5 shows another shared A/V production and consumption environment, according to various embodiments.

Various modifications can be made to embodiments described above. For example, FIG. 5 shows a shared A/V production and consumption environment 500 different from the environment 100 of FIG. 1, according to various embodiments. As in FIG. 1, the environment 500 in FIG. 5 includes an A/V source 105, a producer system 110, a memory system 130, and one or more consumer systems 150. Also as in FIG. 1, the producer system 110 includes a capture module 115, a write module 120, and a read director 125; the memory system 130 includes a shared circular buffer 135 and shared metadata 140; and the consumer systems 150 include read modules 165 and A/V targets 170. Unlike in FIG. 1, the write pointer processor 155 and the dirty region processor 160 in FIG. 5 are implemented in the read director 125 of the producer system 110. In such embodiments, the producer system 110 can track its own shared metadata 140 and can use the shared metadata 140 to inform a requesting consumer system 150 of an appropriate read pointer location (or of the dirty region, as an indication of inappropriate read pointer locations). In some embodiments, when a consumer system 150 is preparing to read from the circular buffer 135, the consumer system 150 queries the read director 125 with a read request time (e.g., indicating a time at which the consumer system 150 desires to start reading). In response to the query, the read director 125 uses the write pointer processor 155 to compute a write pointer location at the read request time (e.g., where the write pointer will be at the requested read start time), and uses the dirty region processor 160 to compute a dirty region at the read request time. In response to the query, the read director 125 can return information to the read module 165 from which the read module 165 can determine an appropriate read pointer location.

Figure 6A:
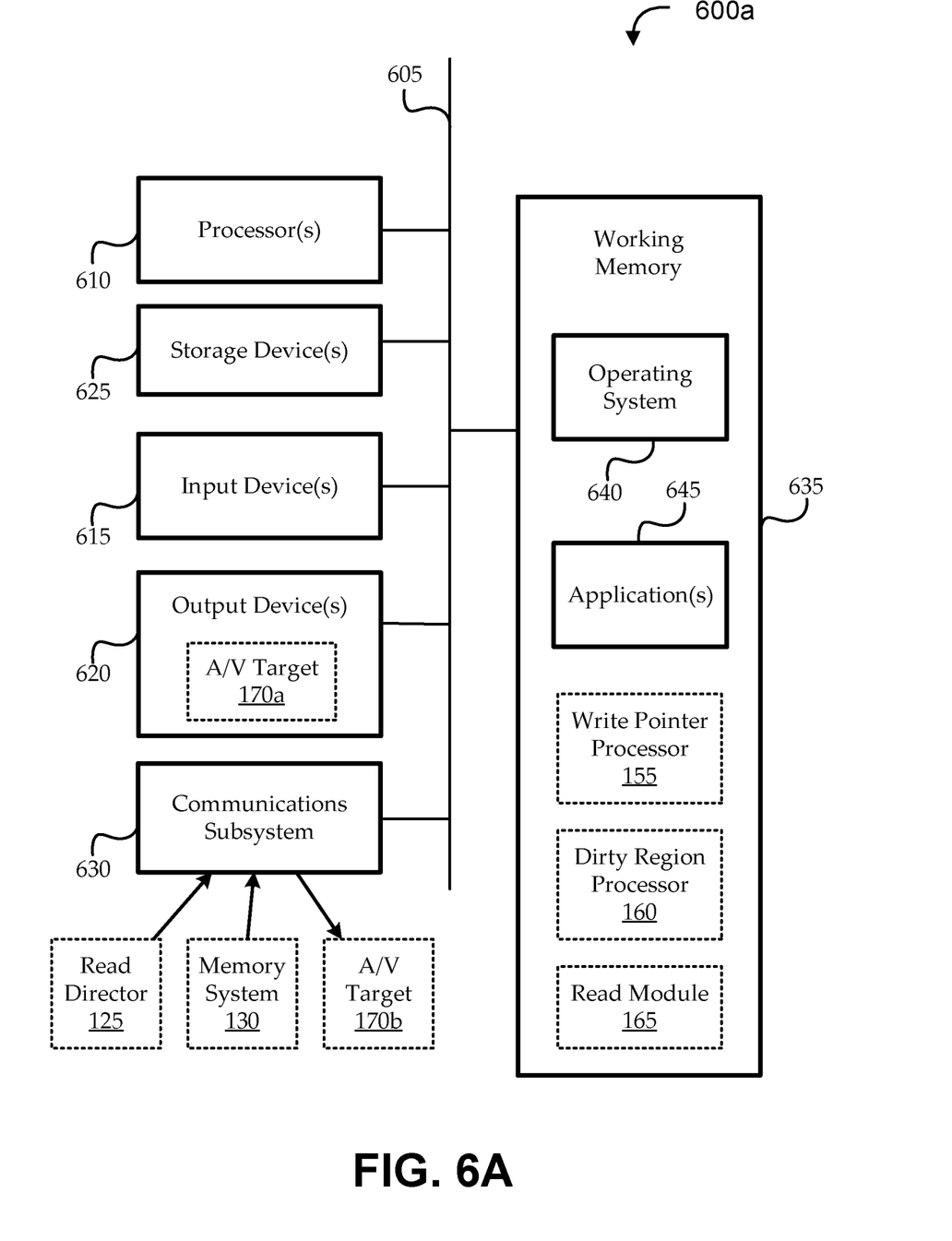
FIGS. 6A and 6B provide schematic illustrations of embodiments of computer systems that can implement various system components and/or perform various steps of methods provided by various embodiments.
Figure 6B:
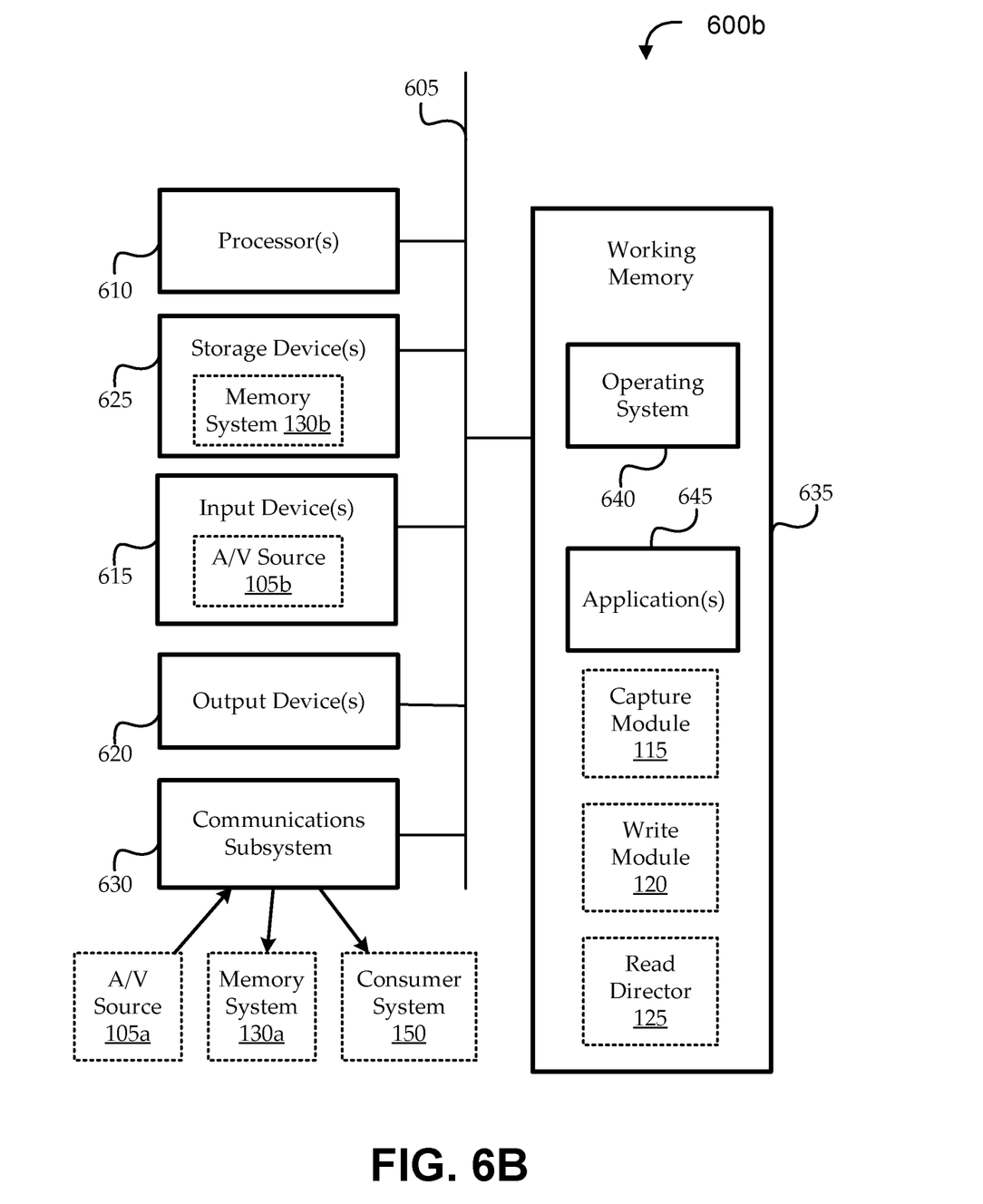

Embodiments of the producer system 110, the consumer systems 150, and or components thereof, can be implemented on, and/or can incorporate, one or more computer systems, as illustrated in FIGS. 6A and 6B. FIGS. 6A and 6B provide schematic illustrations of embodiments of computer systems 600 that can implement various system components and/or perform various steps of methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown including hardware elements that can be electrically coupled via a bus 605 (or may otherwise be in communication, as appropriate). The hardware elements may include one or more processors 610, including, without limitation, one or more general-purpose processors and/or one or more special-purpose processors (such as digital signal processing chips, graphics acceleration processors, video decoders, and/or the like); one or more input devices 615, which can include, without limitation, a mouse, a keyboard, remote control, and/or the like; and one or more output devices 620, which can include, without limitation, a display device, a printer, and/or the like. In some implementations, the computer system 600 is a server computer configured to interface with additional computers (not with human users), such that the input devices 615 and/or output devices 620 include various physical and/or logical interfaces (e.g., ports, etc.) to facilitate computer-to-computer interaction and control.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 600 can also include a communications subsystem 630, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 630 may permit data to be exchanged with a network, other computer systems, and/or any other devices described herein.

In many embodiments, the computer system 600 will further include a working memory 635, which can include a RAM or ROM device, as described herein. The computer system 600 also can include software elements, shown as currently being located within the working memory 635, including an operating system 640, device drivers, executable libraries, and/or other code, such as one or more application programs 645, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

For example, turning to FIG. 6A, the computer system 600a is shown as implementing an illustrative consumer system 150. The computer system 600a can be in communication with the memory system 130 (e.g., with the circular buffer 135 and/or the shared metadata 140) via the communications subsystem 630 (e.g., directly, via a network, etc.). The working memory 635 can be used to implement embodiments of the write pointer processor 155, the dirty region processor 160, and/or the read module 165. For example, each such component can be implemented as instructions, which, when executed, cause the processor(s) 610 to perform functions of those components. The read module 165 can output data to the A/V target 170 in any suitable manner. In one implementation, data is communicated to the A/V target 170 via the communications subsystem 630. In another implementation, the A/V target 170 is an output device 620 of the computer system 600a. In some embodiments, the computer system 600a can also receive various signaling, such as by the read director 125 (via the communications subsystem 630) and/or from the UI subsystem, which can be implemented using input devices 615 of the computer system 600a.

Turning to FIG. 6B, the computer system 600b is shown as implementing an illustrative producer system 110. The computer system 600b can be in communication with the memory system 130 (e.g., with the circular buffer 135 and/or the shared metadata 140) via the communications subsystem 630 (e.g., directly, via a network, etc.) and/or the memory system 130 can be implemented in the storage devices 625 of the computer system 600b. The working memory 635 can be used to implement embodiments of the capture module 115, the write module 120, and/or the read director 125. For example, each such component can be implemented as instructions, which, when executed, cause the processor(s) 610 to perform functions of those components. The capture module 115 can obtain data from the A/V source 105 in any suitable manner. In one implementation, data is obtained from the A/V source 105 via the communications subsystem 630. In another implementation, the A/V source 105 is an input device 615 of the computer system 600b. In some embodiments, the computer system 600b can also communicate with the consumer systems 150 (via the communications subsystem 630), such as by broadcasting signaling data.

A set of these instructions and/or codes can be stored on a non-transitory computer-readable storage medium, such as the non-transitory storage device(s) 625 described above. In some cases, the storage medium can be incorporated within a computer system, such as computer system 600. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 600 and/or can take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which can be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 can cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media can be involved in providing instructions/code to processor(s) 610 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 600.

The communications subsystem 630 (and/or components thereof) generally will receive signals, and the bus 605 then can carry the signals (and/or the data, instructions, etc., carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

Figure 7:
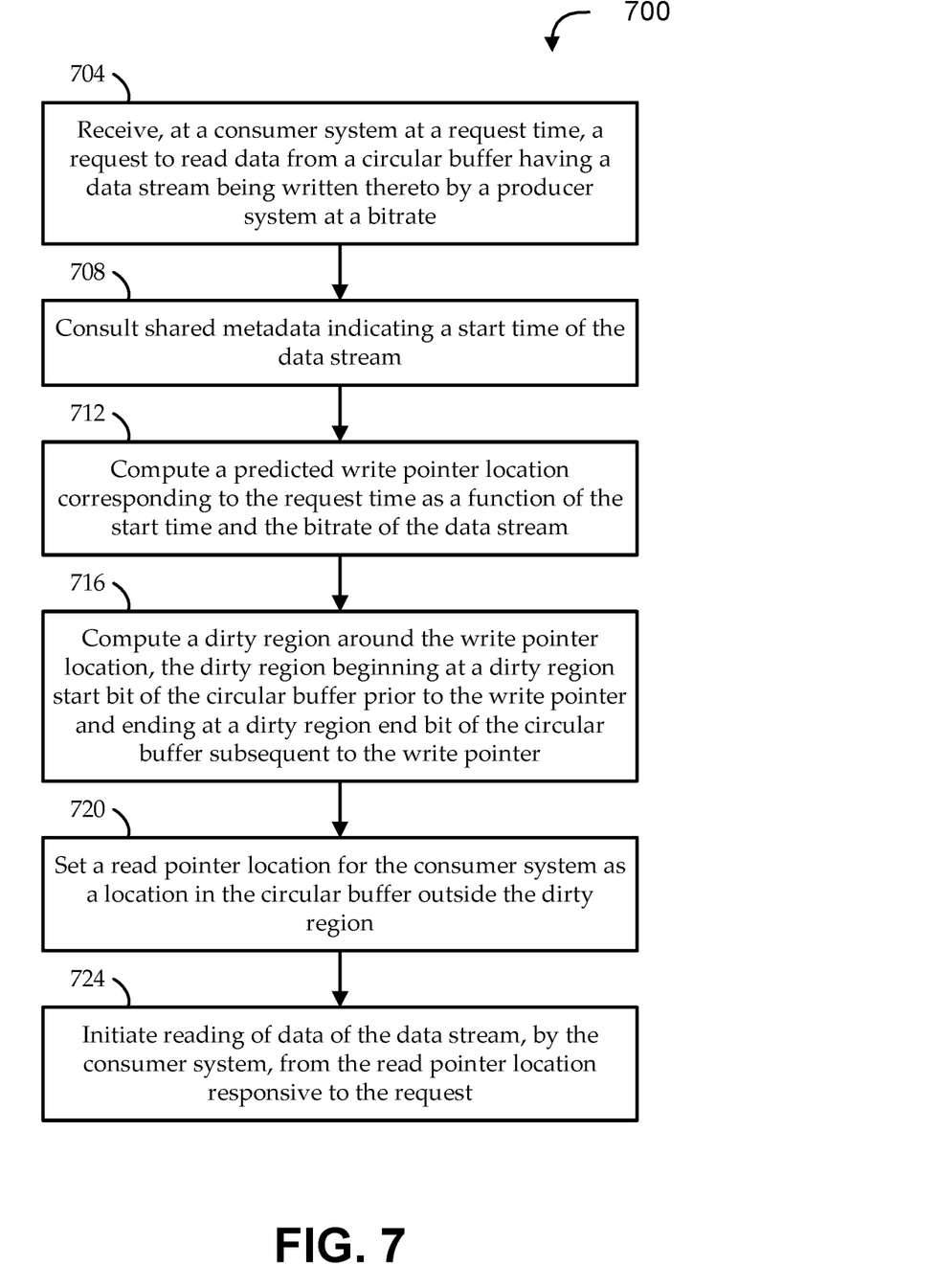
FIG. 7 shows a flow diagram of an illustrative method for lock-free sharing of a circular buffer, according to various embodiments.

Systems including those described above can be used to implement various methods. FIG. 7 shows a flow diagram of an illustrative method 700 for lock-free sharing of a circular buffer, according to various embodiments. Embodiments of the method 700 can begin at stage 704 by receiving a request to read data from a circular buffer having a data stream being written thereto by a producer system at a bitrate. The request can be received by a consumer system at a request time. At stage 708, embodiments can consult shared metadata indicating a start time of the data stream. In some embodiments, the shared metadata indicates additional information, such as a bitrate of the current data stream, a start offset location for the write pointer, etc. In some embodiments, the consulting at stage 708 is responsive to the receiving at stage 704. In other embodiments, the consulting at stage 708 is responsive to receiving signaling from the producer system indicating an update to the shared metadata.

At stage 712, embodiments can compute a predicted write pointer location corresponding to the request time as a function of the start time and the bitrate of the data stream. At stage 716, embodiments can compute a dirty region around the write pointer location. The dirty region can be computed as beginning at a dirty region start bit of the circular buffer prior to the write pointer and as ending at a dirty region end bit of the circular buffer subsequent to the write pointer. In some embodiments, computing the dirty region at stage 716 includes determining a read start lag time for the consumer system and computing a bit-wise lag time as a number of bits of the circular buffer corresponding to the read start lag time as a function of the bitrate. In such embodiments, the dirty region start bit of the circular buffer can be computed as preceding the write pointer by at least the bit-wise lag time, and/or the dirty region end bit of the circular buffer can be computed as subsequent to the write pointer by at least the bit-wise lag time. In other embodiments, computing the dirty region at stage 716 includes setting the dirty region start bit of the circular buffer prior to precede the write pointer by at least a number of bits corresponding to a predetermined real-time read start lag time, and/or setting the dirty region end bit of the circular buffer to follow the write pointer by at least a number of bits corresponding to a predetermined real-time read start lag time.

At stage 720, embodiments can set a read pointer location for the consumer system as a location in the circular buffer outside the dirty region. In some embodiments, the request is for real-time reading of the data stream, and the read pointer location is set at stage 720 to a bit location of the circular buffer corresponding to the dirty region start bit (e.g., or immediately prior to the dirty region start bit). In other embodiments, the request is for archival recording of the data stream, the read pointer location is set at stage 720 to a bit location of the circular buffer corresponding to the dirty region end bit (e.g., or immediately subsequent to the dirty region start bit). At stage 724, embodiments can initiate reading of data of the data stream at the read pointer location by the consumer system. The initiating can be responsive to the request.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for lock-free sharing of a circular buffer, the method comprising:
   receiving, at a consumer system at a request time, a request to read data from a circular buffer having a data stream being written thereto by a producer system at a bitrate;
   consulting shared metadata indicating a start time of the data stream;
   computing a predicted write pointer location corresponding to the request time as a function of the start time and the bitrate of the data stream;
   computing a dirty region around the write pointer location, the dirty region beginning at a dirty region start bit of the circular buffer prior to the write pointer and ending at a dirty region end bit of the circular buffer subsequent to the write pointer;
   setting a read pointer location for the consumer system as a location in the circular buffer outside the dirty region; and
   initiating reading of data of the data stream at the read pointer location by the consumer system, the initiating being responsive to the request.

2. The method of claim 1, wherein the shared metadata further indicates the bitrate, and the computing the predicted write pointer location is as a function of the shared metadata.

3. The method of claim 1, wherein the consulting is by the consumer system in response to the receiving the request.

4. The method of claim 1, further comprising:
   receiving a signal from the producer system indicating an update to the shared metadata,
   wherein the consulting is by the consumer system in response to the receiving the signal.

5. The method of claim 4, wherein the signal indicates a new start time and/or a new bitrate.

6. The method of claim 1, wherein:
   the request is for real-time reading of the data stream; and
   the setting the read pointer location is to a bit location of the circular buffer corresponding to the dirty region start bit.

7. The method of claim 1, wherein:
   the request is for archival recording of the data stream; and
   the setting the read pointer location is to a bit location of the circular buffer corresponding to the dirty region end bit.

8. The method of claim 1, wherein the computing the dirty region comprises:
   determining a read start lag time for the consumer system;
   computing a bit-wise lag time as a number of bits of the circular buffer corresponding to the read start lag time as a function of the bitrate; and
   computing at least one of: dirty region start bit of the circular buffer as preceding the write pointer by at least the bit-wise lag time; or the dirty region end bit of the circular buffer as subsequent to the write pointer by at least the bit-wise lag time.

9. The method of claim 1, wherein the computing the dirty region comprises:
   setting the dirty region start bit of the circular buffer to precede the write pointer by at least a number of bits corresponding to a predetermined real-time read start lag time.

10. A lock-free circular buffer sharing system comprising:
    a write pointer processor to consult shared metadata indicating a start time of a data stream being written to a circular buffer by a producer system at a bitrate, and to compute a write pointer location as a function of the start time and the bitrate of the data stream;
    a dirty region processor, coupled with the write pointer processor, to compute a dirty region around the write pointer location, the dirty region beginning at a dirty region start bit of the circular buffer prior to the write pointer and ending at a dirty region end bit of the circular buffer subsequent to the write pointer; and
    a read module, coupled with the dirty region processor, to set a read pointer location for a consumer system as a location in the circular buffer outside the dirty region, and to initiate reading of data of the data stream at the read pointer location by the consumer system.

11. The lock-free circular buffer sharing system of claim 10, further comprising:
    a memory system comprising the circular buffer and having the shared metadata stored therein.

12. The lock-free circular buffer sharing system of claim 10, further comprising:
    the consumer system comprising the write pointer processor, the dirty region processor, and the read module.

13. The lock-free circular buffer sharing system of claim 10, further comprising:
    the producer system comprising:
    a capture module to capture audiovisual data from an audiovisual source; and a write module, coupled with the capture module and the circular buffer, to write the audio visual data as the data stream to the circular buffer and to write the shared metadata.

14. The lock-free circular buffer sharing system of claim 13, wherein the producer system further comprises:
a read director comprising the write pointer processor and the dirty region processor.

15. The lock-free circular buffer sharing system of claim 10, wherein the read module is further to:
receive a request from a user interface to read the data from the circular buffer; and
direct the write pointer processor to consult the shared metadata responsive to the signal.

16. The lock-free circular buffer sharing system of claim 10, wherein the read module is further to:
receive a signal from the producer system indicating an update to the shared metadata; and
direct the write pointer processor to consult the shared metadata responsive to the signal.

17. The lock-free circular buffer sharing system of claim 10, wherein:
the consumer system is configured for real-time reading of the data stream; and
the read module is to set the read pointer location to a bit location of the circular buffer proximate to and preceding the dirty region start bit.

18. The lock-free circular buffer sharing system of claim 10, wherein:
the consumer system is configured for archival recording of the data stream; and
the read module is to set the read pointer location to a bit location of the circular buffer proximate to and subsequent to the dirty region end bit.

19. The lock-free circular buffer sharing system of claim 10, wherein the dirty region processor is to compute the dirty region by:
determining a read start lag time for the consumer system;
computing a bit-wise lag time as a number of bits of the circular buffer corresponding to the read start lag time as a function of the bitrate; and
computing at least one of: dirty region start bit of the circular buffer prior as preceding the write pointer by at least the bit-wise lag time; or the dirty region end bit of the circular buffer as subsequent to the write pointer by at least the bit-wise lag time.

20. The lock-free circular buffer sharing system of claim 10, wherein the dirty region processor is to compute the dirty region by setting the dirty region start bit of the circular buffer prior to precede the write pointer by at least a number of bits corresponding to a predetermined real-time read start lag time.

* * * * *